United States Patent
Rilby (10) Patent No.: US 11,022,102 B2
(45) Date of Patent: Jun. 1, 2021

(54) METHODS OF PUMPING HEAT TRANSFER FLUID IN THERMAL ENERGY STORAGE SYSTEMS

(71) Applicant: AZELIO AB, Åmål (SE)

(72) Inventor: Erik Rilby, Gothenburg (SE)

(73) Assignee: AZELIO AB, Åmål (SE)

(*) Notice: Subject to any disclaimer, the term of this patent is extended or adjusted under 35 U.S.C. 154(b) by 0 days.

(21) Appl. No.: 16/480,409

(22) PCT Filed: Feb. 14, 2018

(86) PCT No.: PCT/SE2018/050143
§ 371 (c)(1),
(2) Date: Jul. 24, 2019

(87) PCT Pub. No.: WO2018/151654
PCT Pub. Date: Aug. 23, 2018

(65) Prior Publication Data
US 2019/0383276 A1    Dec. 19, 2019

(30) Foreign Application Priority Data

Feb. 14, 2017  (SE) .................................. 1750135-4

(51) Int. Cl.
*F03G 6/06*       (2006.01)
*F04F 1/10*       (2006.01)
(Continued)

(52) U.S. Cl.
CPC .................. *F03G 6/06* (2013.01); *F04F 1/10* (2013.01); *F04F 1/14* (2013.01); *F17D 1/12* (2013.01);
(Continued)

(58) Field of Classification Search
CPC ....... F03G 6/06; F04F 1/10; F04F 1/14; F24S 60/30
See application file for complete search history.

(56) References Cited

U.S. PATENT DOCUMENTS

| | | | | |
|---|---|---|---|---|
| 3,005,417 A | * | 10/1961 | Swaney | F04F 1/10 417/125 |
| 5,242,272 A | * | 9/1993 | Ven | F04F 1/14 417/122 |

(Continued)

FOREIGN PATENT DOCUMENTS

FR          3019854          10/2015

*Primary Examiner* — Shafiq Mian
(74) *Attorney, Agent, or Firm* — Duane Morris LLP; Gregory M Lefkowitz; Brandon A. Chan (57) ABSTRACT

A method of pumping a heat transfer fluid in a thermal energy storage system comprising a first thermal energy storage tank connected to a second thermal energy storage tank via a bi-directional flow member. The first and second thermal energy storage tanks are associated with a pressure vessel system comprising a first and second pressure vessel each pressure vessel being partially fillable with an actuating liquid, wherein, the method for pumping comprises: displacing the actuating liquid from the first pressure vessel to the second pressure vessel, thereby creating a pressure difference in the first thermal energy storage tank with respect to the second thermal energy storage tank, and therein displacing the heat transfer fluid via the bi-directional flow member.

12 Claims, 8 Drawing Sheets

(51) Int. Cl.
*F04F 1/14* (2006.01)
*F17D 1/12* (2006.01)
*F28D 20/00* (2006.01)

(52) U.S. Cl.
CPC ............... *F28D 2020/0047* (2013.01); *F28D 2020/0078* (2013.01); *F28D 2020/0082* (2013.01)

(56) References Cited

U.S. PATENT DOCUMENTS

| | | | |
|---|---|---|---|
| 5,364,208 A | | 11/1994 | Taguchi |
| 5,660,530 A | * | 8/1997 | Rafei ............... F04B 9/125 137/207.5 |
| 5,823,177 A | | 10/1998 | Whitehead |
| 6,701,711 B1 | * | 3/2004 | Litwin ............... F03G 6/067 60/641.11 |
| 2008/0304977 A1 | | 12/2008 | Gaubert et al. |
| 2009/0197322 A1 | * | 8/2009 | Goldman ............... C12M 43/06 435/257.1 |
| 2012/0042643 A1 | | 2/2012 | Lebas et al. |
| 2013/0285380 A1 | | 10/2013 | Afremov |
| 2015/0107246 A1 | * | 4/2015 | Bindingnavale Ranga ............... F28D 20/023 60/641.15 |

\* cited by examiner

METHODS OF PUMPING HEAT TRANSFER FLUID IN THERMAL ENERGY STORAGE SYSTEMS

CROSS-REFERENCE TO RELATED APPLICATIONS

This application is a § 371 national stage entry of International Application No. PCT/SE2018/050143, filed Feb. 14, 2018, which claims priority of Swedish National Application No. 1750135-4, filed Feb. 14, 2017, the entire contents of which are incorporated herein by reference.

FIELD

The present invention pertains to the field of methods and systems for pumping heat transfer fluid in thermal energy storage systems and more particularly to methods of indirect pumping in thermal energy systems comprising a first and second thermal energy storage tank connected by a bi-directional flow member.

BACKGROUND

In concentrated solar power (CSP) generation systems the sun's radiation is focused by parabolic mirrors, heliostats or the like on to solar radiation receivers.

The solar radiation receiver absorbs solar radiation as thermal energy and a conversion system (generally a heat engine) then converts this thermal energy to electrical energy for subsequent distribution. There are several classes of systems that comprise different solar receivers and associated electrical energy generation systems. For example, a parabolic trough system comprises a large surface area of parabolic trough shaped solar collectors directing solar radiation to a heat transfer fluid (HTF) arranged along a focal axis of the parabolic trough. The HTF is then pumped and used to conduct thermal energy to the conversion system for electrical energy generation. Another system is a power tower whereby solar radiation is directed by fields of mirrors which track the sun toward a static central tower. The central tower comprises a HTF which can be used to conduct thermal energy to a conversion system. A Linear Fresnel reflector uses a system of flat linear mirrors approximating the parabolic shape of a parabolic trough and directing the solar radiation to a solar receiver comprising a HTF which can be used for subsequent electrical energy generation as described.

An especially efficient solar receiver design is the parabolic dish system. The parabolic dish system comprises a parabolic dish comprising mirror(s) on an inner surface which tracks the sun in 2-axis during the day. The solar radiation is concentrated at a focal point by the mirror(s) where it is traditionally converted directly to electrical energy via a conversion system such as a Stirling or Rankine cycle engine. As parabolic dish systems can be modular, installed on uneven ground, take less space than the other named system and are especially efficient they are particular ideal candidates for cost-effective CSP systems.

However, as opposed to the other static receiver systems generally parabolic dish systems, which have a moving solar receiver, do not use a HTF and have no capacity for thermal energy storage as the energy conversion system is located directly at the focal point of the parabolic dish. Without thermal energy storage, the parabolic dish systems only generate electrical energy during hours of sunlight.

Thermal energy storage systems for storing thermal energy generated during periods of sunlight are known in concentrated solar power systems having static solar receivers but there is a lack of thermal energy storage systems suitable for use with parabolic dish systems.

The known thermal energy storage systems generally operate with a hot storage tank, operating at up to around 390° C.-560° C., storing thermal energy from the solar receiver (either storing the HTF, or storing energy from the HTF in a different medium). In such a system, the energy in the hot storage tank is thereafter accessed and distributed to the electrical energy generator via the HTF. After electrical energy generation, the HTF has a reduced temperature and it, or energy therefrom, is thereafter stored in a cold storage tank operating at around 290° C. or less. The cold storage tank acts as a receptacle for the used/cooler fluid. After storage in the cold tank, and when the receiver is again receiving sunlight, the HTF is pumped back to the receiver to be warmed again. The fluid must be maintained at a high temperature throughout this entire process and the temperature of the cold tank is always at or below the temperature of the used HTF, and the used HTF cannot be used for the generation of electrical energy until the receiver is receiving sunlight again.

For efficiency reasons, it is desirable to heat the HTF to as high a temperature as possible. However, this creates complexities in transferring the HTF from the receiver, where it is heated, to the conversion unit generating electrical energy from the thermal energy. For example, a fluid having a very high heat capacity may have a relatively high melting point and must be maintained at a high temperature throughout the fluidic path. Furthermore, a very hot fluid is difficult to pump and requires expensive and complex specially designed pumps. Typically, efforts to overcome these problems have targeted the provision of an ideal fluid having a low melting point and high specific heat.

In light of these drawbacks a system which can store energy for substantial periods of time and pump the heat transfer fluid more reliably and cost effectively is desired.

SUMMARY

Accordingly, the present invention preferably seeks to mitigate, alleviate or eliminate one or more of the above-identified deficiencies in the art and disadvantages singly or in any combination and solves at least the above mentioned problems by providing a method of pumping a heat transfer fluid in a thermal energy storage system comprising a first thermal energy storage tank connected to a second thermal energy storage tank via a bi-directional flow member. The first and second thermal energy storage tanks are associated with a pressure vessel system comprising a first and second pressure vessel each pressure vessel being partially fillable with an actuating liquid, wherein, the method for pumping comprises: displacing the actuating liquid from the first pressure vessel to the second pressure vessel, thereby creating a pressure difference in the first thermal energy storage tank with respect to the second thermal energy storage tank, and therein displacing the heat transfer fluid via the bi-directional flow member.

Thermal energy storage systems are also provided.

Further advantageous embodiments are disclosed below and in the appended patent claims.

BRIEF DESCRIPTION OF THE DRAWINGS

These and other aspects, features and advantages of which the invention is capable, will be apparent and elucidated from the following description of embodiments of the present invention, reference being made to the accompanying drawings, in which

FIG. 8a-c shows the results of a simulation of performance in discharging the system.

DETAILED DESCRIPTION

Figure 1:
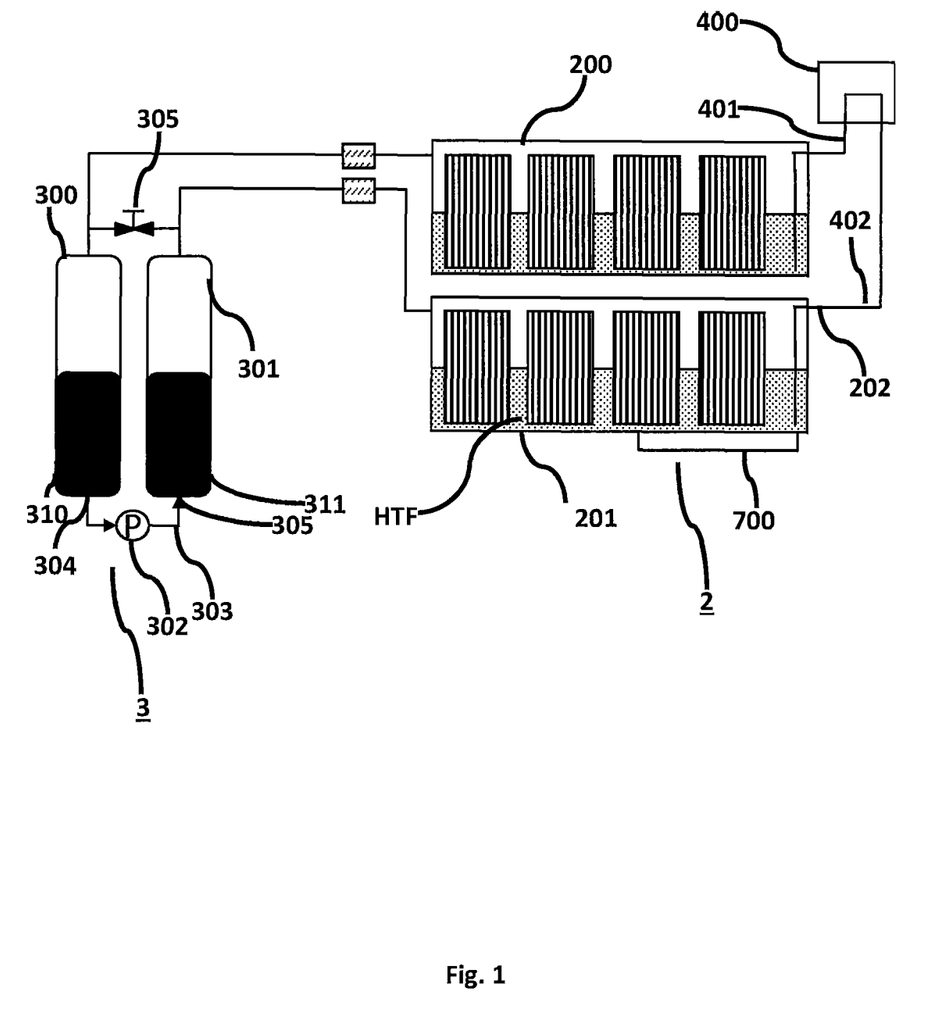
FIG. 1 is a schematic view of system according to the invention.

For a further understanding of the present invention, reference should be made to the following detailed description taken in conjunction with the accompanying drawings, wherein:

FIG. 1 shows a thermal energy storage system 2 comprising a first thermal energy storage (TES) tank 200 and a second thermal energy storage (TES) tank 201 for receiving a Heat Transfer Fluid. The first and second TES tanks 200, 201 are fluidically connected via at least one bi-directional flow member 202 such that a Heat Transfer Fluid (HTF) can be reversibly displaced from the first TES tank 200 to the second TES tank 201. By reversibly displaced it is meant that the HTF can be flowed in an oscillating manner from the first TES tank 200 to the second TES tank 201 and then back again via the bi-directional flow member 202.

The bi-directional flow member 202 has a first end provided at a lower region of the first TES tank 200. The bi-directional flow member 202 has a second end provided at a lower region of the second TES tank 201. The first and second ends of the bi-directional flow member 202 must be positioned such that, during pumping of the HTF, the first and second ends are always immersed in HTF. Otherwise gas bubbles may form in the system. During system initialisation the first and second ends do not need to be immersed in HTF.

The HTF is displaced by the provision of a pressure differential in the first TES tank 200 with respect to the second TES tank 201. The pressure differential generates a force acting on the HTF in the first TES tank 200 and therein actuates the displacement of the HTF to the second tank 201. The pressure present at the first end of the bi-directional flow member 202 is greater than the pressure at the second end of the bi-directional flow member 202. This pressure difference means that the HTF flows through the bi-directional flow member 202.

The inventors have identified that an ideal way of creating the pressure differential between the first TES tank 200 and the second TES tank 201 is to associate the TES system 2 with at least one pressure vessel system 3.

In FIG. 1 A pressure vessel system 3 comprising a first and second pressure vessel 300, 301 is associated with the TES system 2. The first pressure vessel 300 is connected to the first TES tank 200. In FIG. 1 the first pressure vessel 300 is connected to the first TES tank 200 by a fluidic conduit having a first end at an upper region of the first pressure vessel 300 and a second end at an upper region of the first TES tank 200. The second pressure vessel 301 is connected to the second TES tank 201. Each of the first and second pressure vessels 300, 301 is partially filled with an actuating liquid. In FIG. 1 the second pressure vessel 301 is connected to the second TES tank 201 by a fluidic conduit having a first end at an upper region of the second pressure vessel 301 and a second end at an upper region of the second TES tank 200. An actuating liquid flow path 303 is provided between the first and second pressure vessels 300, 301. The actuating liquid flow path 303 may be connected at a first end 304 to a lower region 310 of the first pressure vessel 300. The actuating liquid flow path 303 may also be connected at a second end 305 to a lower region 311 of the second pressure vessel 301. A pump 302 is provided in communication with the actuating liquid flow path 303. The pump is for pumping actuating liquid, it does not need to be capable of pumping HTF.

The total volume of actuating liquid in both the first and second pressure vessels 300, 301 is constant. That is, the volume of actuating liquid in the pressure vessel system 3 is constant. The remaining volume of the pressure vessel system 3, that is, the volume not filled with actuating liquid may comprise, such as be filled with a fluid, for example an inert gas such as $N_2$. The remaining volume may comprise, such as be filled with $CO_2$, especially if the HTF or PCM (see below for further information regarding PCM) comprise carbonate salts. Other inert gases such as Argon may also be suitable but cost of such a gas may be prohibitive.

During operation, the pressure vessel system 3 and the TES system 2 are closed and the total volume of the pressure vessel system 3 and the connected TES system 2 is constant. More specifically, the volume of the first and second pressure vessels 300, 301, and the first and second TES tanks 200, 201 is fixed. This enables in-direct pumping of HTF from the first TES tank 200 to the second TES tank 201 and back again without the requirement of a pump acting directly on the HTF. The pump 302 acts only on the actuating liquid, and the pressure differential created in the system causes the displacement of HTF. This will now be further described.

The actuating liquid can be pumped from the first pressure vessel 300 to the second pressure vessel 301 via the pump 302. The displacement of the actuating liquid causes a pressure differential in the first TES tank 200 with respect to the second TES tank 201. This pressure differential creates a force on any HTF present in the first or second TES tanks 200, 201 and displaces the HTF via the bi-directional flow member 202.

The first TES tank 200 may be provided at a height above the second TES tank 201. The first TES tank 200 and the second 201 need not be thermally isolated from one another. It may be advantageous to have them adjacent and in thermal contact such that any heat energy provided to the first or second TES tank 300, 301 is conducted to the second or first TES tank 301, 300.

A thermal energy storage system 2 comprising a single pressure vessel is also envisaged. In such a system the HTF is displaced via the actuation of a mechanical piston acting in the single pressure vessel which displaces an inert gas. The displacement of the inert gas causes an increase in pressure at the first TES tank 200 and therein forces the displacement of HTF from the first TES tank 200 to the second TES 201. The mechanical piston may then be retracted, causing a reduction in pressure in the first TES tank 200 and therein the HTF is flowed in a reverse direction.

Another, less preferred, method of displacing the HTF is to displace the first and second TES tanks (200, 201) relative to one another. For example, by raising the first TES tank 200 above the height of the second TES tank 201 the force of gravity acting on the fluid in the first TES tank 200 causes it to flow through the bi-directional flow member 202 in to the second TES tank 201. The second TES tank 201 can thereafter be raised above the first TES tank 200 and the flow is reversed.

In all of the described methods of pumping the HTF, the pressure of HTF at the first end of the bi-directional flow member 202 is increased relative to the pressure at the second end of the bi-directional flow member 202, and therein HTF from the first thermal energy storage tank 200 is displaced to the second thermal energy storage tank 201.

A valve 305 may be provided between the first and second pressure vessels 300, 301 for equalizing the pressure in the first and second pressure vessels 300, 301. The pressure differential between the first and second pressure vessels 300, 301 can be equalized on opening the valve 305. The valve 305 is generally closed during system operation such that the pressure vessel system 3 is closed and therein that the pumping of the fluids between the first and second pressure vessel 300, 301 causes a pressure differential between the first and second TES tanks 200, 201.

In one non-limiting example a method of pumping heat transfer fluid in a thermal energy storage system is described wherein the thermal energy storage system may comprise a first thermal energy storage tank connected to a second thermal energy storage tank via a bi-directional flow member. The first and second thermal energy storage tanks being connected via fluidic conduits with a pressure vessel system comprising a first and a second pressure vessel each first and second pressure vessel being partially fillable with an actuating liquid, wherein, the pumping is conducted through displacing the actuating liquid from the first pressure vessel to the second pressure vessel, thereby creating a pressure difference in the first thermal energy storage tank with respect to the second thermal energy storage tank, and therein displacing the heat transfer fluid via the bi-directional flow member.

Figure 2:
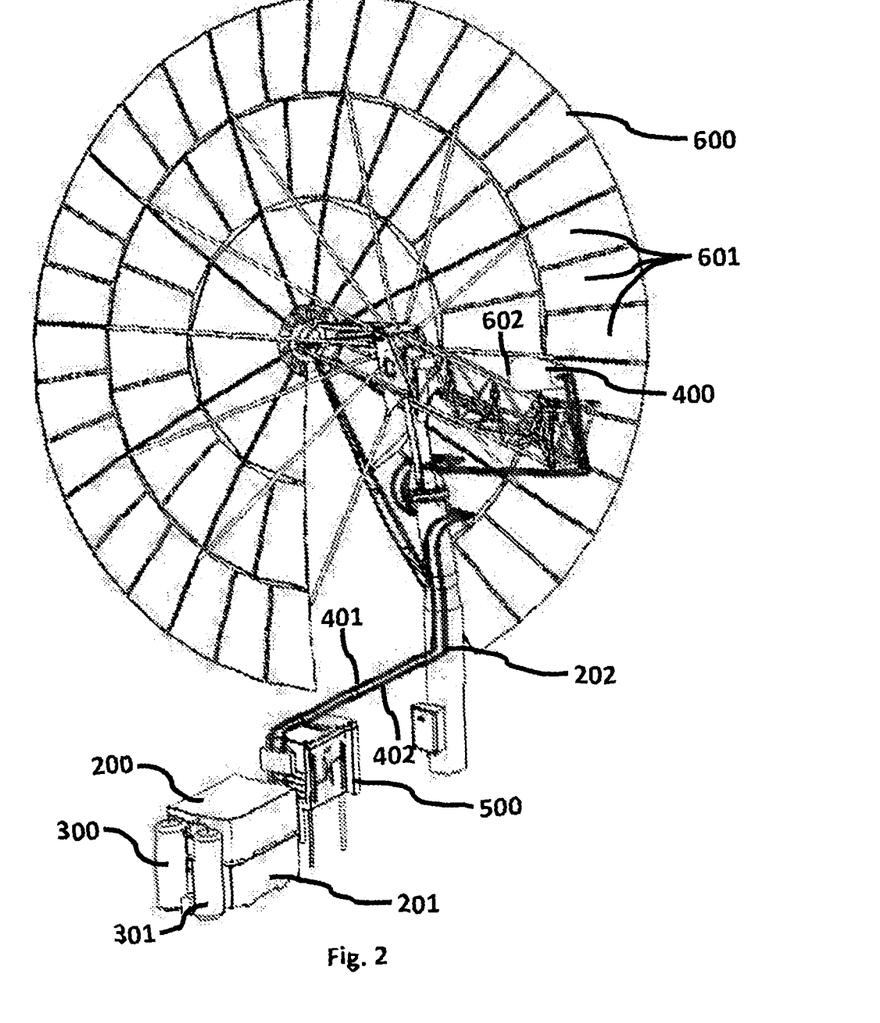
FIG. 2 is a perspective view of an arrangement of a system according to the invention.

The thermal energy storage system 2 may be connected to a solar receiver 400. The solar receiver 400 receives solar radiation and is generally heated, or a portion thereof is heated. In a parabolic dish CSP system, solar radiation may be reflected and focused on the solar receiver 400 by a parabolic dish 600 as shown in FIG. 2. The parabolic dish 600 comprises a plurality of mirrors 601 reflecting and focusing the solar radiation at a focal point 602. In all types of CSP systems, the solar receiver 400 is located at a focal point where sunlight is reflected and focused. Referring again, specifically to parabolic dish systems, as the solar parabolic dish 600 moves in 2-axis and tracks the sunlight during the day, the focal point 602 and therein the solar receiver 400 also moves during the day. That is, the solar receiver 400 in a parabolic dish 600 CSP system is not static. It is also generally located at a height above ground level. Other systems for reflecting and/or focusing solar radiation on the solar receiver 400 may be possible to combine with the thermal energy storage system 2 described herein. For example, static solar receiver systems such as parabolic trough, linear Fresnel, and power tower systems could also be used. In such systems, the solar receiver does not move, it is static.

The solar receiver 400 is thermally connected to the thermal energy storage system 2. As is shown in FIG. 1, the solar receiver may be connected to the first TES tank 200 and connected to the second TES tank 201. Heat generated at the solar receiver 400 is conducted to the first and second TES tanks 200, 201. The solar receiver 400 is connected to the first TES tank 200 via a first thermal flow path 401. The first thermal flow path 401 may be a conduit for HTF. The solar receiver 400 is connected to the second TES via a second thermal flow path 402. The second thermal flow path 402 may be a conduit for HTF. The first and second thermal flow paths 401, 402 may be connected such that a combined thermal flow path is formed from the first TES tank 200 to the second TES tank 201. In systems comprising a combined thermal flow path and wherein the thermal flow paths form conduits for the HTF: HTF can flow from the first TES tank 200, through the first thermal flow path 401 to the solar receiver 400, where it may be warmed by solar radiation directed at the solar receiver 400, through the second thermal flow path 402 to the second TES tank 201. The HTF is then stored in the second TES tank 201.

In a system where the first and second thermal flow paths 401, 402 form a combined thermal flow path and wherein the thermal flow paths form conduits for the HTF the combined thermal flow path is the bi-directional flow member 202 described above. For clarification's sake, the solar receiver 400 may be provided along the bi-directional flow member 202. HTF may flow through the solar receiver 400.

As described previously, the displacement of the HTF from the first/second TES tank to the second/first TES tank 200, 201 can be actuated via indirect pumping whereby a volume of actuation liquid is displaced from the first or second pressure vessel 300, 301 to the second or first pressure vessel 301, 300 thereby creating a pressure difference between the first and second TES tanks 200, 201 and that pressure difference forces the HTF through the first and second thermal flow paths 401, 402. The first and second flow paths 401, 402 may be flexible pipes forming conduits for the HTF. The provision of flexible pipes as the first and second flow paths 401, 402 reduces the complexity in systems comprising a parabolic solar dish as the solar receiver inherently 400 moves with the dish and therefore rigid pipes require more complex joints and connections.

As is known in concentrated solar power systems, an electrical energy generation system 5 is provided to generate electrical energy from the thermal energy generated by the solar receiver 400, and/or stored in the thermal energy storage system 2. The electrical energy generation system 5 is an energy conversion system, converting thermal energy to electrical energy. The electricity generated by the electrical energy generation system 5 can be fed in to an electricity grid, or electricity distribution network. The electrical energy generation system 5 may comprise a conversion unit 500 operating on the Stirling cycle, Rankine cycle, Brayton cycle, or any other heat engine capable of efficiently generating electrical energy from thermal energy to electrical energy.

In FIG. 1 a Stirling engine is shown as the electrical energy generation system 5. The conversion unit 500 is in thermal connection with the HTF. The conversion unit 500 is in thermal connection with the first and second thermal flow paths 401, 402. Due to the use of a HTF and as opposed to traditional concentrated solar power systems comprising parabolic dishes, the conversion unit 500 need not be located at the focal point 602 of the parabolic dish 600. The conversion unit 500 may be provided adjacent to the TES system 2. Providing the Stirling engine at a location not at the focal point 602 of the parabolic dish 600 greatly improves ease of installation and maintenance as the Stirling engine does not need to move with the parabolic dish 600.

The solar receiver 400 but not the conversion unit 500 moves with the parabolic dish 600.

Figure 3:
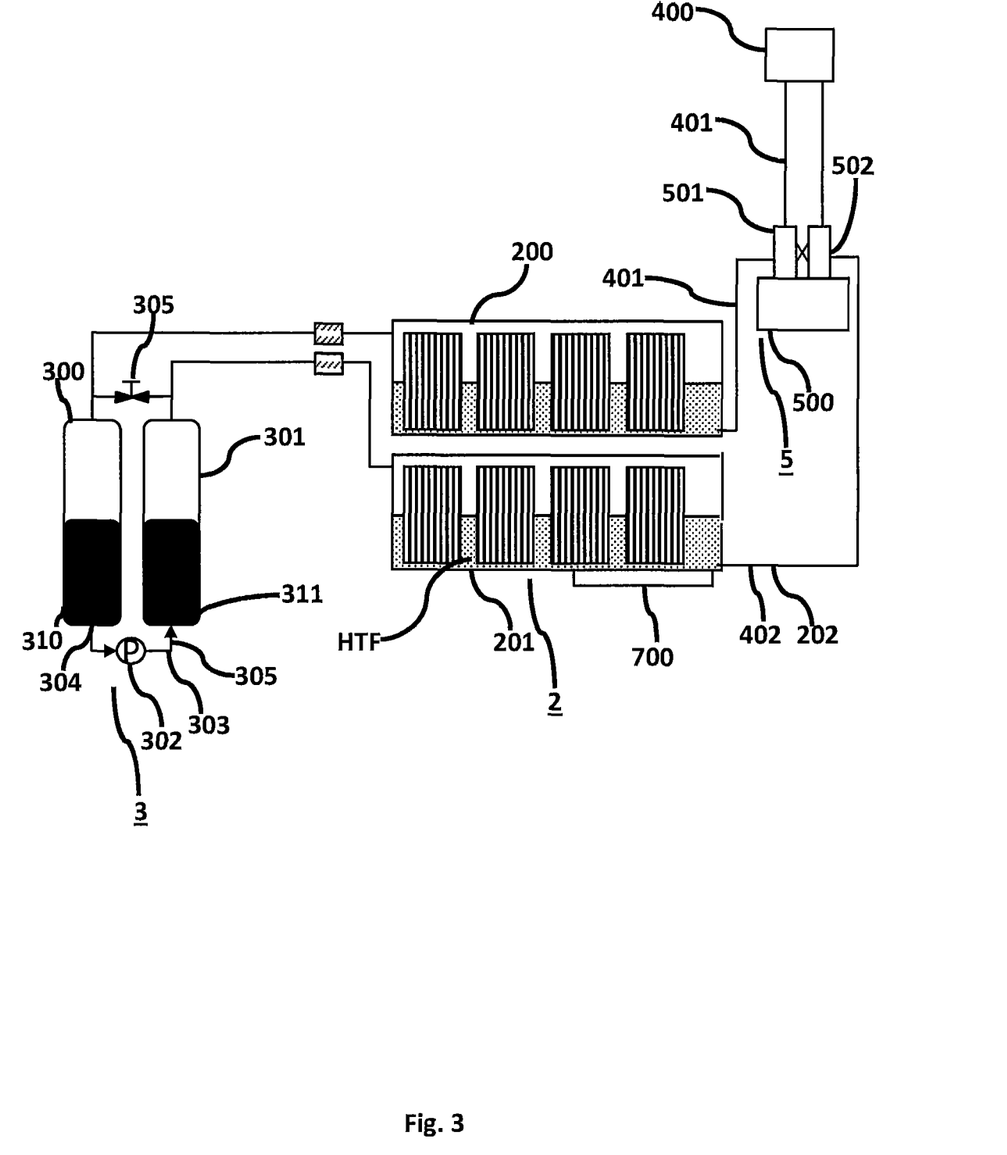
FIG. 3 is a schematic view of an arrangement of a system according to the invention.

The electrical energy generation system 5 may comprise at least one heat exchanger 501 for transferring the thermal energy from the HTF to the working fluid of the conversion unit 500. In FIG. 3 a pair of heat exchangers 501, 502 are shown for receiving energy from the HTF. A first heat exchanger 501 is arranged on the first thermal flow path 401, a second heat exchanger 502 is arranged on the second thermal flow path 402. As can be seen in FIG. 3 there is a single thermal path comprising the first TES tank 200, the first thermal flow path 401, the first heat exchanger 501, the solar receiver 400, the second heat exchanger 502, the second thermal flow path 402 and the second TES tank 201. Ideally, the single thermal flow path is also a flow path for HTF. That is, the flow path forms a conduit for the flow of HTF.

The electrical energy generation system 5 need not be in fluidic connection to the TES system 2. A thermosiphon may be provided between the TES system 2 and the electrical energy generation system 5. The thermosiphon is a longitudinally, and generally vertically, extending receptacle comprising a fluid whereby heat energy provided at the lower portion raises under convection and can be extracted at an upper portion. The thermosiphon may thermally connect both the first and second TES tanks 200, 201 to the electrical energy generation system 5, such as to the heat exchangers 501, 502.

The first TES tank 200 and the second TES tank 201 are provided with at least one phase change material PCM for storing and/or releasing energy from/to the HTF. The at least one PCM may for example be a salt having a melting point substantially greater than the melting point of the HTF.

The at least one PCM material may be encapsulated in members physically, but not thermally, isolating the PCM from the HTF. The PCM is, as is known in the art, a material which absorbs energy during heating as phase change from e.g. a solid to a liquid takes and releases energy to the adjacent environment during the reversed cooling process. During heating of the PCM in a solid phase the solid increases temperature (sensible energy storage). During phase change from solid to liquid energy is stored latently. After phase change to a liquid energy is again stored sensibly and the PCM in liquid phase increases temperature.

The PCM in the TES tanks 200, 201 acts as a reliable and predictable thermal energy storage medium. Therein a substantial amount of thermal energy can be stored in the TES system 2 beyond that which could be stored in only the HTF. The PCM may comprise any media capable of storing thermal energy such as a salt, or mixture of salts, a particle such as sand, concrete or combinations of the above. The PCM may have a melting point from 500° C. to 900° C., such as from 650° C. to 810° C. During operation, the temperature of the first and second TES tanks (200, 201) is from about 500° C. to about 900° C.

The HTF has a melting point of from 200° C. to 500° C., such as from 300° C. to 400° C. The HTF may comprise a molten salt, molten glass and/or liquid metal(s). For example, suitable molten salts may be eutectic salts of carbonates, fluorides, or chlorides and/or nitrate salts. The HTF may comprise oxides. The HTF may also comprise mixtures of the above in various fractions. Whilst named a fluid it is obvious that the HTF is simply a substance which is a fluid, i.e., is at a temperature greater than melting point, at its normal operating temperatures.

Figure 5:
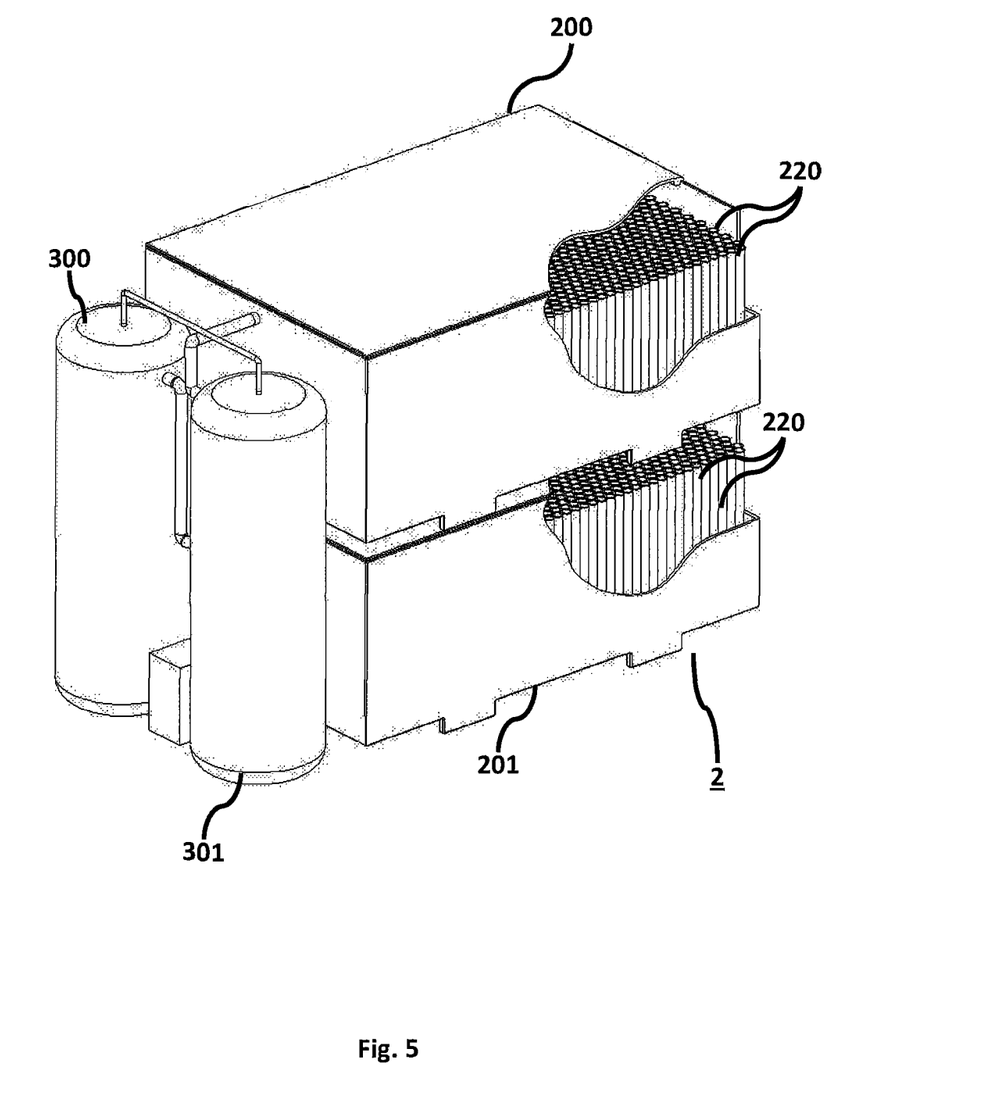
FIG. 5 is a perspective cut-away view of the thermal energy storage system according to the invention.

As described above, the PCM is comprised within a plurality of members being PCM receptacles 220. Each PCM receptacle 220 comprises a portion for storing PCM and a wall which physical separates the PCM in the portion for the storing the PCM from the HTF. The PCM receptacles 220 may be longitudinally extending members having a substantially vertical alignment. The PCM receptacles 220 may be cylindrical members, having a circular cross-section. They may also be longitudinally extending members have square, hexagonal, or oval cross-sections. The PCM receptacles 220 may have an opening in an upper portion such that the PCM can expand freely on phase change without a pressure build-up occurring within the receptacle. The PCM receptacles 220 are sealed at the bottom portion such that HTF present in the first and second TES tanks 200, 201 cannot directly contact the PCM. The PCM receptacles 220 may be arranged in a grid as shown in FIGS. 1, 3 and 5. The PCM receptacles 220 are arranged substantially parallel to each other.

FIG. 5 shows a cut-away view of the thermal energy storage system 2 showing an arrangement of PCM receptacles 220 in both the first and second TES tanks 200, 201. The plurality of PCM receptacles 220 are arranged parallel and adjacent to one another in a grid. The HTF can flow around the PCM receptacles 220 and therein heat the PCM in the PCM receptacles 220.

The first and second TES tanks 200, 201 may be provided with a second PCM having a melting point substantially higher than the melting point of the HTF but substantially lower than the melting point of the first PCM. This second PCM may be considered a low-temp PCM, with the first PCM being considered a high-temp PCM. The low-temp PCM may have a melting point from 0 to 100° C. higher than the melting point of the HTF. The TES system 2 may comprise from 0 to 30% by mass of the low-temp PCM. One advantage of the low-temp PCM is that the HTF can be maintained in liquid state for longer compared to a TES system 2 not comprising a low-temp PCM. The low-temp PCM is not used for maintain the HTF at a temperature suitable for energy generation in the energy conversion system 5 but rather maintains the HTF in a liquid state.

As shown in FIG. 1 the TES system 2 may comprise a pre-heater 700 for heating the HTF and TES system 2. The pre-heater 700 may be in thermal connection with the first or second TES tank 200,201 and is arranged for heating the HTF on system initialization.

Figure 6:
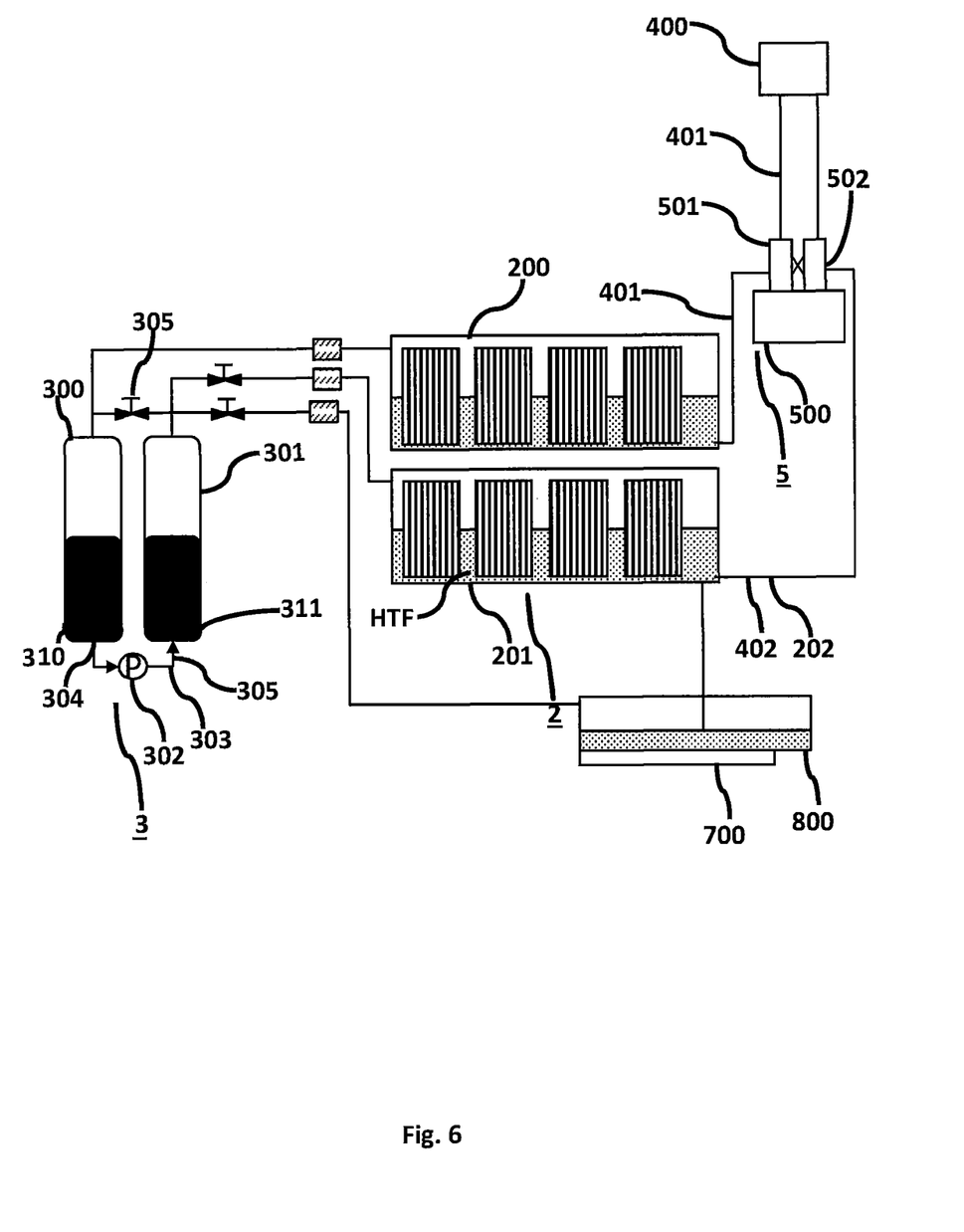
FIG. 6 is a schematic view on an arrangement of a system according to the invention showing a separate pre-heating/drainage tank.

As is shown in FIG. 6 it is also possible that the pre-heater 700 may be arranged in communication with a separate HTF storage/drainage tank 800. The separate HTF storage/drainage tank 800 is provided in fluidic communication with the pressure vessel system 3, for the provision of pressure to displace the HTF, and the first or second TES tank 200, 201, for the transfer of HTF.

Figure 7:
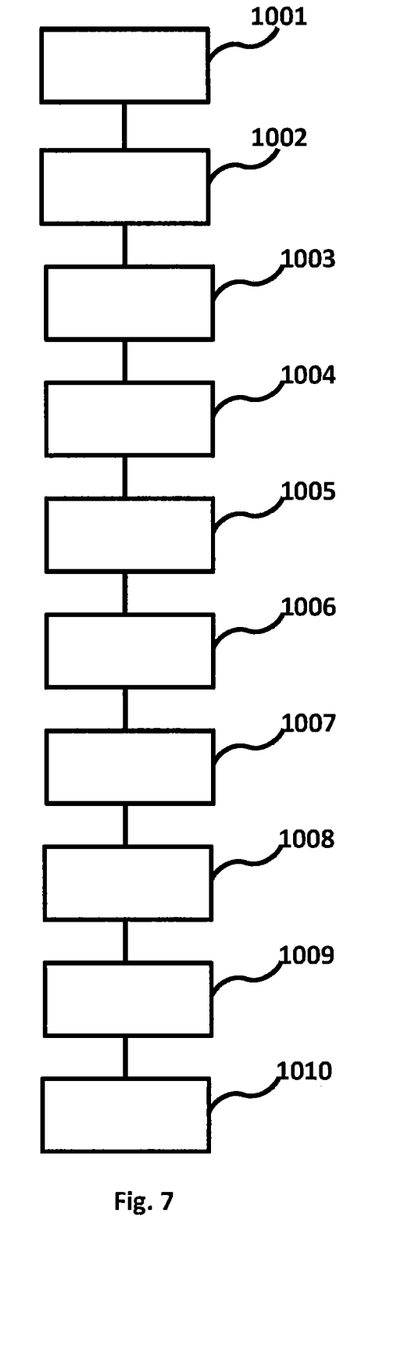
FIG. 7 is a flowchart for initialisation.

With reference to FIG. 7 a method for initializing a TES system 2 will now be described.

With the TES system 2 off and prior to starting the valve 305 can be opened 1001 and the volume of actuating liquid in each of the first and second pressure vessels 300, 301 is equalized 1002 by the pump 302. As the valve 305 is open the HTF in the TES system 2 will flow, due to the gravity, to the lowest point in the TES system 2. In FIG. 1, the lowest point is the second TES tank 201. By altering the arrangement of the tanks the first TES tank 200 could be positioned lower than the second TES tank 201. Irrespective of which tank is at a higher or lower point, all HTF will be present in a single tank.

The pre-heater may then begin to pre-heat 1003 the HTF in the second TES tank to or above its melting point. Super heating the HTF above its melting point prevents the HTF from freezing if there are cold spots in the system that haven't been pre-heated sufficiently. The super heating could be from 1 to 100° C. above the melting point of the HTF, such as from 10 to 50° C. As stated previously, the first and second TES tanks 200, 201 may be thermally connected to each other, and in such a way, heating the second TES tank 201 may, via conduction, heat the first TES tank 200.

The solar receiver 400 and thermal flow paths 401, 402 are also pre-heated 1004. The valve 305 may be closed 1005 such that the first and second pressure vessels 300, 301 are only connected via the actuating liquid flow path 303. The actuating liquid is pumped 1006 via the pump 302 to the pressure vessel in connection with the TES tank comprising the HTF. According to the system in FIG. 1, the actuating liquid is pumped via the pump 302 to the second pressure vessel 301, which is connected to the second TES tank 201. An inert gas, such as $N_2$, is then provided 1007 to the first TES tank 200. The inert gas acts to charge the system and to aid in pre-heating. The inert gas flows through the bi-direction flow member 202 in to the HTF in the second TES tank 201. The inert gas may be provided to the first TES tank 200 such that a predetermined pressure in the pressure vessel system 3 is reached. The actuating liquid may then be pumped 1008, via the pump 302 from the second pressure vessel 301 to the first pressure vessel 300 such that the inert gas is displaced and flows through the bi-directional flow member 202 and eventually to the second TES tank 201.

After the actuation liquid has been pumped in to the first pressure vessel 300, the pressure vessel system 3 is reset.

The valve 305 is then opened and the actuating liquid is pumped 1009, via the pump 302, to the first pressure vessel 300. The actuating liquid is pumped to a height such that pressure provided by the actuating liquid when the pump 302 ceases pumping is sufficient to overcome the static pressure of the HTF at the highest point, above the lowest system level, in the bi-directional flow member 202. As shown in FIG. 1 the highest point in the bi-directional flow member is generally the solar receiver 400. The valve 305 can now be closed 1010 and the pressure vessel system 3, and TES system 2 now have a fixed total volume.

On pumping the actuating liquid from the first pressure vessel 300 to the second pressure vessel 301 the HTF flows from the second TES tank 201 to the first TES tank 200. The volumes of actuating liquid in each of the first and second pressure vessels 300, 301 are equalized such that the volume of HTF in each of the first and second TES is therein equalized. As the pressure vessel system 2 and TES system 2 are closed the pump 302, to displace the HTF the pump 302 no longer needs to overcome the static pressure of the system. It has to only overcome the internal pressure losses in the HTF conduits.

The indirect pumping method can then be used to oscillate the HTF from the first TES tank 201 to the second TES tank, via the solar receiver 400. Therein a 2 hot-tank TES system 2 with indirect pumping is achieved. The system has a great thermal storage capacity as two tanks are utilized for thermal energy storage. As the pump 302 does not need to pump HTF, but only the actuating liquid, operational costs are significantly reduced.

Charging the TES system 2 is when the thermal energy stored in the TES system 2 is increased such that it can be accessed later for electrical energy generation. Charging the TES system 2 occurs during hours of sunlight when the solar receiver 400 is receiving sunlight. The HTF is oscillated from the first TES tank 200 to the second TES tank 201 via the bi-directional flow member 202. The solar receiver 400 is provided at a point along the bi-directional flow member 202. The HTF is heated via the solar radiation at the solar receiver 400. The HTF may pass through the solar receiver 400. During charging, the temperature of the HTF on entering the solar receiver 400 is lower than the temperature of the HTF leaving the solar receiver. The thermal energy in the HTF is transferred to the PCM, or PCMs, in the first and second TES tanks 200, 201. The thermal energy is therein stored in the first and second TES tanks 200, 201.

Discharging the TES system 2 is when energy stored in the TES system 2 is accessed and therein that the thermal energy present in the system is decreased. Discharging the TES system normally occurs when electrical energy is to be generated by the energy conversion system 5. One way of discharging the system is to provide an energy conversion system 5 in thermal connection with the bi-directional flow member 202. HTF is oscillated from the first TES tank 200 to the second TES tank 201 via the bidirectional flow member 202. The energy conversion system 5 generally comprises a first heat exchanger 501, provided between on the first thermal flow path 401 of the bi-directional flow member 202, arranged to receive thermal energy from the HTF. The thermal energy is used to drive the energy conversion unit 500 and can thereafter be converted to electrical energy. A second heat exchanger 502 can be provided on the second thermal flow path 402 and arranged to receive thermal energy from the HTF. The second heat exchanger 502 provides the capacity for improved energy conversion. As described previously the HTF is oscillated from the first TES tank 200 to the second TES tank 201 and back again. During discharging the temperature of the PCM drops as energy is removed from the TES system 2. Once the temperature of the PCM is below its melting point the TES system 2 is considered empty and discharging for electrical energy generation ceases. If, as described previously, the TES system 2 comprises a second low-temp PCM, having a melting point substantially lower than the melting point of the first PCM, then the system is considered empty when the first high-temp PCM has dropped below its melting point.

When the TES system 2 is neither charging nor discharging, that is, when the system is at idle, the HTF can be maintained in both the first and second TES tanks 200, 201 such that HTF is maintained above its melting point by the thermal energy stored in the PCM. If the TES system comprises a second low-temp PCM then the HTF is maintained above its melting point predominantly by energy stored in the low-temp PCM.

During charging, discharging and idle, the PCM in each of the first and second TES tanks 200, 201 are maintained at a temperature higher than the melting point of the HTF.

Figure 4:
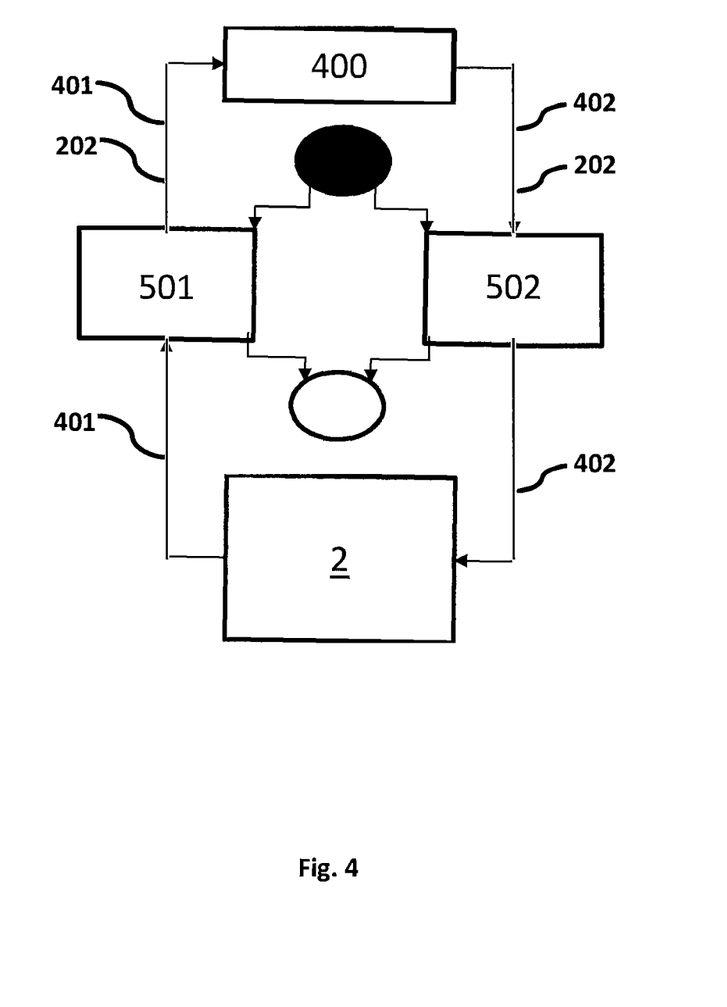
FIG. 4 is a schematic view of an arrangement of a system according to the invention.

FIG. 4 shows a schematic of the system. The system comprises a TES system 2, a solar receiver 400 and an electrical energy generation system 5. A first heat exchanger 501 is provided on the first thermal flow path 401. A second heat exchanger 502 is provided on the second thermal flow path 402. The thermal flow paths 401, 402 form the bi-directional flow member 202. The different temperatures at different points of the system will now be described. As an example, after initialization and during charging the temperature of the TES system 2 may be about 714° C. The temperature of HTF flowing in the first thermal energy flow path 401 between the TES system 2 and the first heat exchanger 501 may therefore in the ideal case be about 714° C. The temperature of the HTF in the first thermal energy flow path 401 after leaving the first heat exchanger 501 and before reaching the solar receiver 400 may be about 704° C. (10° C. drop during heat exchanging). The HTF is then heated in the solar receiver 400 by about 40° C. The temperature of the HTF in the second thermal flow path 402, between the solar receiver 400 and the second heat exchanger 502 may therefore be about 744° C. the temperature of HTF in the second thermal flow path 402 after leaving the second heat exchanger 502 may be about 734° C. (10° C. drop during heat exchanging). As the temperature of the TES system 2 was about 714° C., and the temperature of HTF entering the TES system 2 is about 734° C. then the HTF may slightly increase the temperature of the TES system 2.

As an example, after initialization and during discharging the temperature of the TES system 2 may be about 714° C. The temperature of HTF flowing in the first thermal energy flow path 401 between the TES system 2 and the first heat exchanger 501 may therefore be about 714° C. The temperature of the HTF in the first thermal energy flow path 401 after leaving the first heat exchanger 501 and before reaching the solar receiver 400 may be about 704° C. (10° C. drop during heat exchanging). During discharging the HTF is not heated in the solar receiver 400. The temperature of the HTF in the second thermal flow path 402, between the solar receiver 400 and the second heat exchanger 502 may therefore be about 704° C. the temperature of HTF in the second thermal flow path 402 after leaving the second heat exchanger 502 may be about 694° C. (10° C. drop during heat exchanging). As the temperature of the TES system 2 was about 714° C., and the temperature of HTF entering the TES system 2 is about 694° C. then the HTF may slightly decrease the temperature of the TES system 2.

In the above description the HTF flowing from the TES system 2 flows from the first TES tank 200 to the second TES tank 201. As has been described previously it may also flow in a reciprocal or oscillating manner, from the second TES tank 201 to the first TES tank 200. This oscillating flow of HTF is used in both charging and discharging the TES system 2. The oscillating flow allows the system to charge and discharge the TES system without needing to have a pump acting directly on the HTF as would be the case with a traditional system. This reduces system costs substantially.

Also provided is a method of pumping a heat transfer fluid in a thermal energy storage system 2, the thermal energy storage system 2 comprising first thermal energy storage tank 200 connected to a second thermal energy storage tank 201 via a bi-directional flow member 202 having a first end provided at the first thermal energy storage tank 200, and a second end provided at the second thermal energy storage tank 201, the method comprising: increasing the pressure of the heat transfer fluid present at the first end of the bi-directional flow member 202 relative to the pressure at the second end of the bi-directional flow member 202, and therein displacing heat transfer fluid from the first thermal energy storage tank 200 to the second thermal energy storage tank 201.

Simulation

Figure 8:
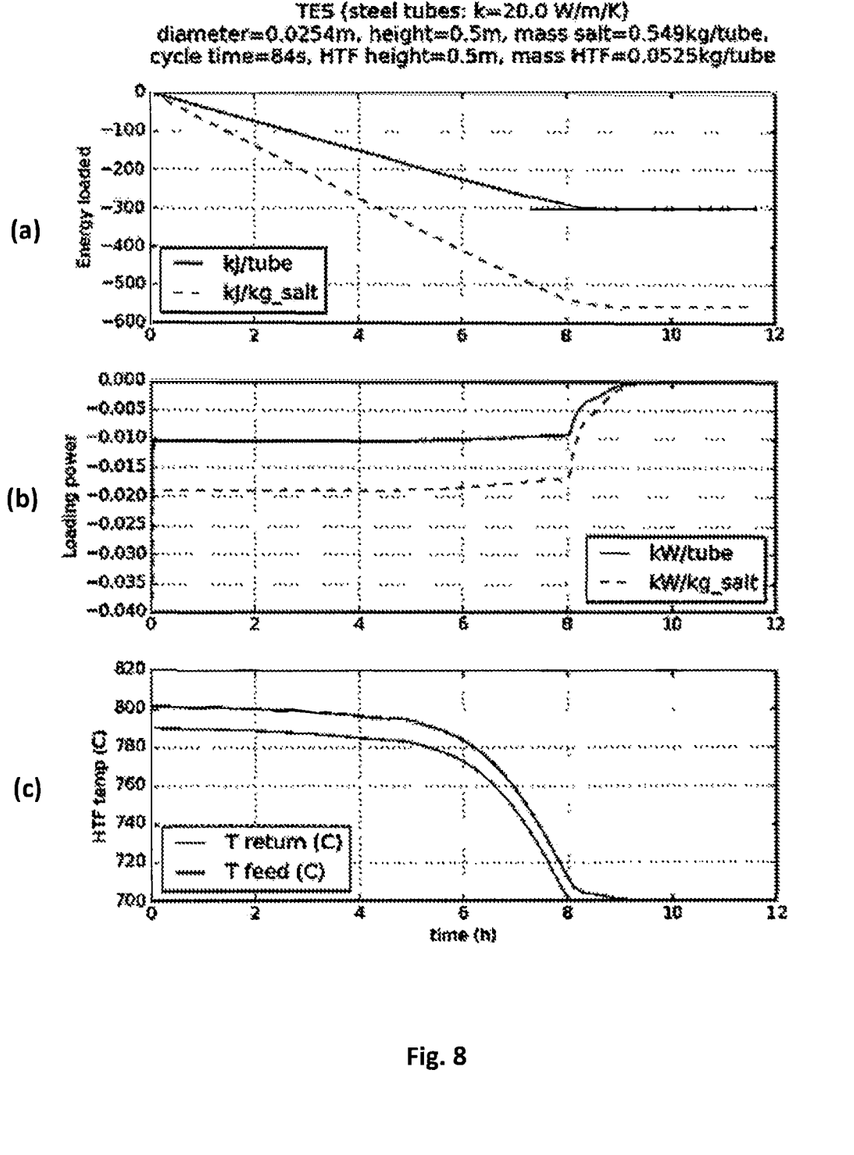

FIG. 8a-c shows results of simulation of the expected performance during discharging the TES system 2 described herein.

Parameters

In the simulation the PCM was 2200 kgs of salt. The PCM receptacles 220 were modelled as having walls comprising steel. The HTF was modelled as filling up the first and second TES tanks 200, 201 to the total height of PCM receptacles 220. Mass flow of HTF was 2.5 kg/s. This equals a temperature delta of 11° C. for a heat load of 40 kW. The cycle time, that is the time taken to displace the HTF from the first TES tank to the second TES tank and then back again was 84 seconds.

Results

FIGS. 8a and 8b show that the extracted power from the system over the first 8 hours is equal. FIG. 8c shows that the temperature from the system decreases over time. The current system design as described herein provides sufficiently high thermal energy storage temperatures for about 6 hours.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the scope of the invention.

What is claimed is:

1. A method of pumping a heat transfer fluid in a thermal energy storage system, the thermal energy storage system comprising a first thermal energy storage tank connected to a second thermal energy storage tank via a bi-directional flow member, the first and second thermal energy storage tanks being connected via fluidic conduits with a pressure vessel system comprising a first and a second pressure vessel each first and second pressure vessel being partially fillable with an actuating liquid, wherein, the method for pumping comprises: oscillating the actuating liquid via a pump provided in the fluidic connection between the first pressure vessel and the second pressure vessel, thereby creating a pressure difference in the first thermal energy storage tank with respect to the second thermal energy storage tank, and therein oscillating the heat transfer fluid via the bi-directional flow member.

2. The method according to claim 1, wherein the first and second pressure vessels and the first and second thermal energy storage tanks form a closed system having a substantially constant volume during operation.

3. The method according to claim 1, wherein the actuating liquid has a temperature substantially lower than the temperature of the heat transfer fluid during operation.

4. The method according to claim 1, wherein the method comprises oscillating the flow of actuating liquid from the second pressure vessel to the first pressure vessel and therein oscillating the flow of heat transfer fluid.

5. The method according to claim 1, wherein a solar receiver is provided at a point along the bi-directional flow member and wherein the heat transfer fluid passes through the solar receiver.

6. The method according to claim 5, wherein the heat transfer fluid is oscillated between the first thermal energy storage tank and the second thermal energy storage tank via the solar receiver.

7. The method according to claim 1, wherein, the first pressure vessel is connected to the first thermal energy storage tank via a fluidic conduit having a first end provided at an upper region of the first pressure vessel and a second end provided at an upper region of the first thermal energy storage tank.

8. The method according to claim 1, wherein the second pressure vessel is connected to the second thermal energy storage tank via fluidic conduit having a first end provided at an upper region of the second pressure vessel and a second end provided at an upper region of the second thermal energy storage tank.

9. The method according to claim 1, wherein the bi-directional flow member has a first end provided at a lower region of the first thermal energy storage tank and a second end provided at a lower region of the second thermal energy storage tank.

10. The method according to claim 1, wherein the heat transfer fluid has a melting point from about 200° C. to about 500° C.

11. The method according to claim 1, wherein the temperature of contents of the first and second thermal energy storage tanks during operation is from about 500° C. to about 900° C.

12. A thermal energy storage system comprising a first thermal energy storage tank connected to a second thermal energy storage tank via a bi-directional flow member, the first and second thermal energy storage tanks being arranged to receive a heat transfer fluid, said first and second thermal energy storage tanks further being connected via fluidic conduits with a pressure vessel system comprising a first and second pressure vessel each first and second pressure vessel being partially fillable with an actuating liquid to be displaced between the pressure vessels via a pump provided in fluidic connection between the first pressure vessel and the second pressure vessel to create a pressure difference in the first thermal energy storage tank with respect to the second thermal energy storage tank indirectly displacing the heat transfer fluid.

\* \* \* \* \*